(12) United States Patent
Walpole

(10) Patent No.: US 7,819,131 B2
(45) Date of Patent: Oct. 26, 2010

(54) SPRINGLESS COMPRESSOR VALVE

(75) Inventor: James J. Walpole, Cypress, TX (US)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 11/057,770

(22) Filed: Feb. 14, 2005

(65) Prior Publication Data
US 2006/0180208 A1 Aug. 17, 2006

(51) Int. Cl.
F16K 15/06 (2006.01)
F16K 31/08 (2006.01)

(52) U.S. Cl. .............. 137/533.23; 137/512.1; 137/516.13; 137/516.15; 137/529; 251/65

(58) Field of Classification Search .......... 137/528, 137/529, 516.11, 516.13, 516.15, 516.17, 137/516.19, 516.21, 516.23, 512.1, 533.17, 137/533.21, 533.23, 533.25, 533.27; 251/65
See application file for complete search history.

(56) References Cited

U.S. PATENT DOCUMENTS

| | | | |
|---|---|---|---|
| 2,367,260 A | | 1/1945 | Beddoes |
| 2,599,898 A | * | 6/1952 | Dalrymple .................. 251/65 |
| 2,667,895 A | * | 2/1954 | Pool et al. ................... 251/65 |
| 2,888,037 A | * | 5/1959 | Jones et. al. ................ 251/65 |
| 3,189,675 A | * | 6/1965 | Moore ......................... 251/65 |
| 3,212,751 A | * | 10/1965 | Hassa .......................... 251/65 |
| 3,409,038 A | * | 11/1968 | Blackford .................... 251/65 |
| 3,485,441 A | * | 12/1969 | Eaton, Jr. ..................... 251/65 |
| 3,495,620 A | * | 2/1970 | Bazell et al. ................. 251/65 |
| 4,273,153 A | * | 6/1981 | Brown ......................... 251/65 |
| 4,446,608 A | | 5/1984 | Johnson |
| 4,512,934 A | * | 4/1985 | Bucher ........................ 251/65 |
| 4,670,939 A | | 6/1987 | Fisher |
| 4,750,705 A | * | 6/1988 | Zippe .......................... 251/65 |
| 4,793,779 A | | 12/1988 | Schabert et al. |
| 4,799,507 A | | 1/1989 | Hrabal |
| 4,869,289 A | | 9/1989 | Hrabal |
| 5,025,828 A | * | 6/1991 | Lin .............................. 251/65 |
| 5,320,136 A | | 6/1994 | Morris et al. |
| 5,356,211 A | | 10/1994 | Fritsch |
| 5,366,506 A | | 11/1994 | Davis |
| 5,547,344 A | | 8/1996 | Sugiyama et al. |

(Continued)

FOREIGN PATENT DOCUMENTS

EP  457066 A1  4/1991

(Continued)

OTHER PUBLICATIONS

Joe Kane, Unique Poppet Valve Developed for Piston Compressors, CompressorTechTwo, May-Jun. 1997, Diesel & Gas Turbine Publications, Flensburg, Democratic Republic of Germany.

Primary Examiner—John Rivell
(74) Attorney, Agent, or Firm—Fletcher Yoder

(57) ABSTRACT

A valve closure system particularly suited to reciprocating compressors employs no springs and preferably urges the valve in the closed direction by the force generated from magnets positioned to repel each other and in that manner deliver the force to keep the compressor valve closed. Other applications are envisioned and different techniques for replacing the spring component in such valve assemblies are also contemplated.

18 Claims, 2 Drawing Sheets

U.S. PATENT DOCUMENTS

| | | |
|---|---|---|
| 5,885,062 A | 3/1999 | Inoue et al. |
| 5,947,708 A | 9/1999 | Park et al. |
| 5,961,550 A * | 10/1999 | Carpentier et al. ............ 251/65 |
| 6,000,417 A * | 12/1999 | Jacobs ......................... 251/65 |
| 6,152,710 A | 11/2000 | Oh et al. |
| 6,179,268 B1 | 1/2001 | Seid |
| 6,532,919 B2 | 3/2003 | Curtis et al. |
| 6,581,632 B2 * | 6/2003 | Walpole et al. .......... 137/512.1 |
| 6,585,500 B2 | 7/2003 | Park et al. |
| 6,591,864 B1 * | 7/2003 | Denby ......................... 251/65 |
| 6,644,945 B2 | 11/2003 | Lilie et al. |
| 6,684,651 B1 | 2/2004 | Yoshizawa et al. |
| 6,751,941 B2 | 6/2004 | Edelman et al. |
| 6,790,018 B2 | 9/2004 | Lee et al. |
| 6,799,746 B2 | 10/2004 | Shafer |
| 6,810,901 B2 | 11/2004 | Burford |
| 7,533,692 B2 * | 5/2009 | Walpole et al. ........ 137/533.27 |
| 2003/0037822 A1 | 2/2003 | Fischer et al. |

FOREIGN PATENT DOCUMENTS

| | | |
|---|---|---|
| EP | 700668 A1 | 9/1994 |
| GB | 2416822 | 8/2006 |
| WO | 2006045300 A2 | 5/2006 |

\* cited by examiner

SPRINGLESS COMPRESSOR VALVE

FIELD OF THE INVENTION

The field of this invention is valves particularly valves that cycle frequently and actuators for them operate without springs.

BACKGROUND OF THE INVENTION

Compressor valves come in a variety of designs and are powered open by differential pressure and in the typical known design use some type of a spring to push the valve to the close position. The main issue with such designs is spring fatigue and failure after a predetermined number of cycles. Thus the problem addressed by the present invention is to present a valve design that can provide an economical construction and a reliably long service life. That objective is accomplished by elimination of the spring and the use of a force that preferably has a longer life cycle by using components that are less affected or better withstand the cycling that is the duty of a valve particularly one in a compressor application. In a preferred embodiment, the closing force is provided by the alignment of like poles of permanent magnets. Other embodiments are contemplated that deliver a closing force through a device that is not prone to fatigue or wear as would be experienced in an application involving a spring.

In many applications outside of compressor valves not only have springs been used but they have been combined with electromagnets to create an opening force against a spring return. Hydraulic pistons can also be used in conjunction with springs. These variations are all suggested in related U.S. Pat. Nos. 4,799,507 and 4,869,289. Other examples of electromagnets or permanent magnets for solenoid valves and valve actuators and other applications are U.S. Pat. Nos. 6,179,268; 6,532,919; and 5,356,211. U.S. Pat. No. 6,799,746 relies on a spring inside the valve to return an actuating piston to an original position in response to movement induced by an electromagnet. In yet other applications, such as a door closer in U.S. Pat. No. 4,670,939 a magnet moves a ball that acts as a valve member to control the flow of hydraulic fluid when controlling the closing and opening of a door. U.S. Pat. No. 5,366,506 shows an intraurethral valve with a magnetic valve member that can be selectively opened to allow urine to pass by moving another magnet from outside the body. The following patents show the general state of the art of compressor valves: U.S. Pat. Nos. 6,810,901; 6,790,018; 6,751,941; 6,684,651; 6,644,945; 6,585,500; 6,152,710; 5,947,708; 5,885,062; 5,547,344; 5,025,828; 4,793,779 and 4,446,608.

What is needed, particularly in a compressor application where a reciprocating compressor that runs at 300-1800 RPM and has valves that cycle between 5-20 times per second corresponding to that speed is a more reliable closing force that improves on the service life seen from coil springs or plate type closing springs. While the preferred embodiment is to use neodymium-iron-boron permanent magnets with similar poles facing, those skilled in the art will appreciate the full scope of the invention from the specification and claims, which appear below.

SUMMARY OF THE INVENTION

A valve closure system particularly suited to reciprocating compressors employs no springs and preferably urges the valve in the closed direction by the force generated from magnets positioned to repel each other and in that manner deliver the force to keep the compressor valve closed. Other applications are envisioned and different techniques for replacing the spring component in such valve assemblies are also contemplated.

DETAILED DESCRIPTION OF THE DRAWINGS

DETAILED DESCRIPTION OF THE PREFERRED EMBODIMENT

Figure 1:
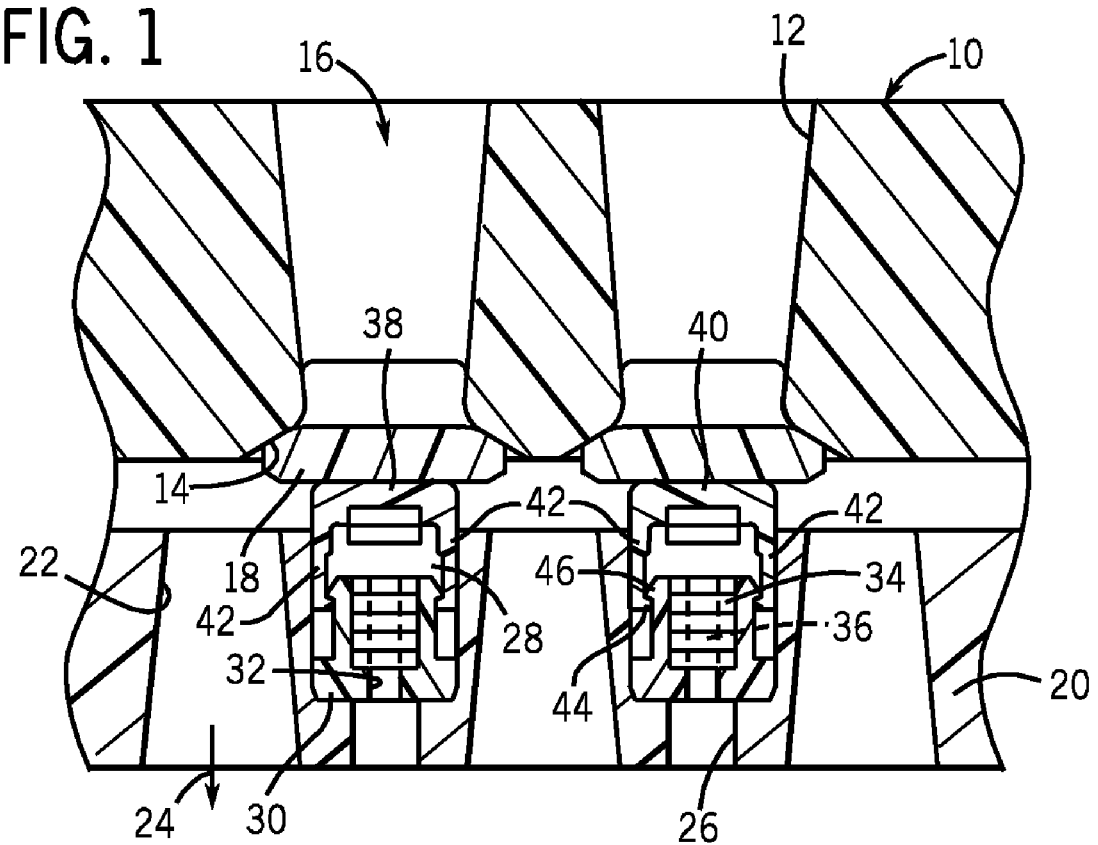
FIG. 1 is a section view of a magnet driven closure for a concentric ring type valve.
Figure 2:
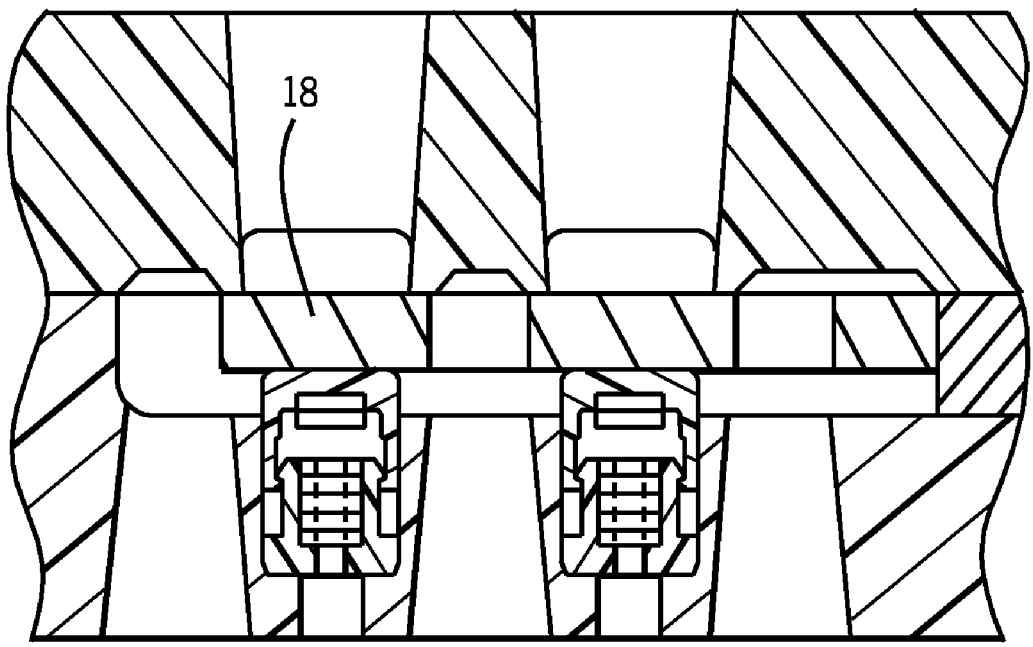
FIG. 2 is a section view of a magnet driven closure for a ported plate styled valve in a compressor.
Figure 3:
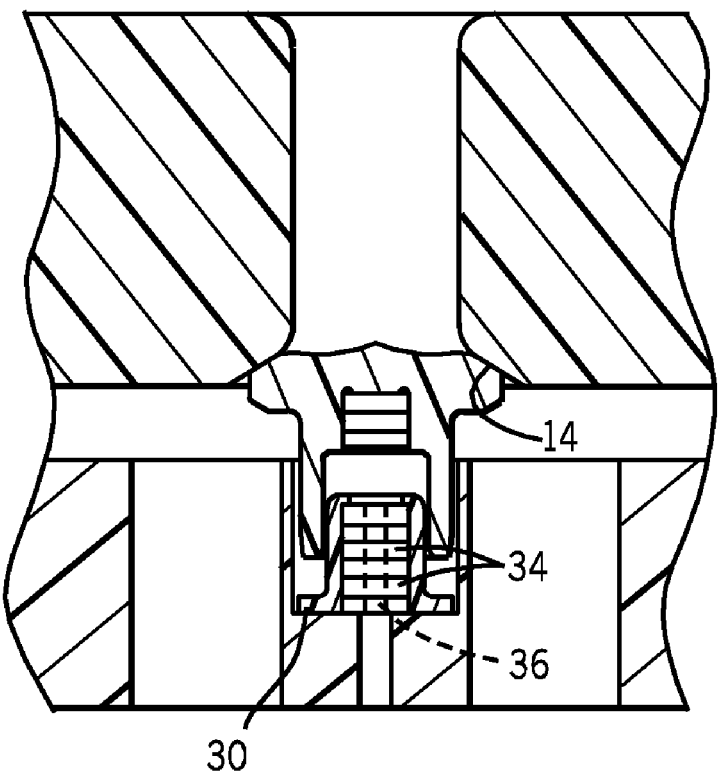
FIG. 3 is a section view of a magnet driven closure for a poppet styled valve in a compressor.
Figure 4:
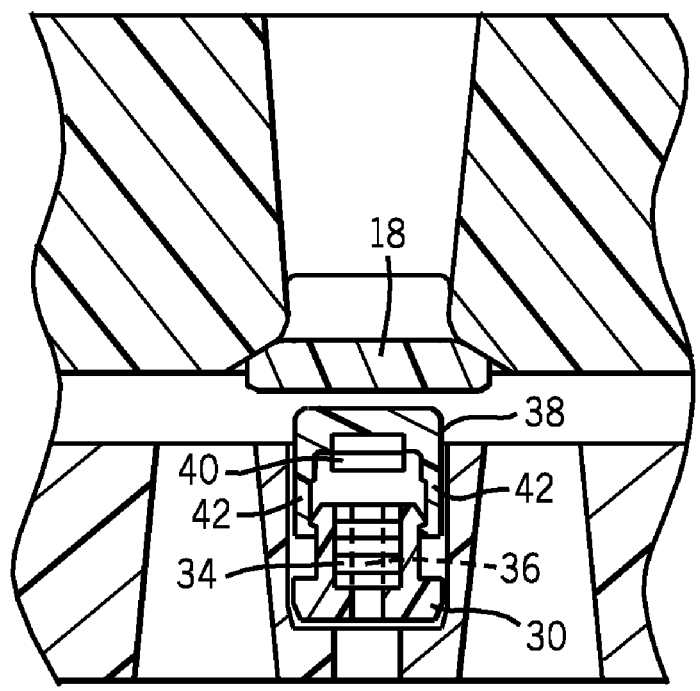
FIG. 4 is a section view of a magnet driven closure for a ring styled valve which uses either a single ring or a multitude of identical rings (not concentric) in a compressor

Referring to FIG. 1, the seat 10 has passages 12 that lead to a seating surface 14. Flow represented by arrow 16 progresses on pressure buildup to push against the valve member 18 to displace it from seating surface 14, whereupon the flow passes through guard 20 through passages 22 as represented by arrow 24. Aligned with the valve member 18 and extending in guard 20 is a small bore 26 leading into a bigger bore 28. A shoe 30 having a bore 32 is secured or mounted in bore 28. A magnet 34 that has a bore 36 aligned in fluid communication with bore 32 is mounted in shoe 30. A button 38 rides over a portion of the shoe 30 and is slidably retained to it to limit its stroke and to keep the two from being detached in ported plate and ring valves. In particular, the button 38 includes legs 42 extending from the button 38 on either side of the shoe 30. The legs 42 include lips 44 extending from the legs 42. In addition, the shoe 30 also includes lips 46 extending from the shoe 30. Movement (e.g., the stroke) of the button 38 with respect to the shoe 30 is limited by the lips 44, 46. In poppet valves shown in FIG. 3, there is no shoe; instead, a magnet is mounted directly in the poppet, and is not slidably retained. A magnet 40 is mounted to the button 38 in such a manner that the orientations of magnets 34 and 40 is such that like poles face each other creating a repelling force that is overcome by rising pressure in passages 12 to get the valve member 18 off of seating surface 14. The valve member 18 can be any one of a number of designs. A concentric ring design is illustrated in FIG. 1 and a ported plate design is shown in FIG. 2, a poppet valve is shown is FIG. 3, and a ring, either single ring or multiple same size non-concentric rings for the valve member 18. In all other respects the illustrated embodiments of FIGS. 1 and 2 and 4 work in the same way. The embodiment also works the same way, but there is no button (magnet is in poppet) in FIG. 3, and the poppet is not slidably retained.

Those skilled in the art will appreciate that the springs on valves particularly in compressor applications can be eliminated using the magnets. The magnets can be permanent or electromagnets of combinations of both. The magnets represent the preferred execution of the invention that comprises the elimination of springs to close the valves. Other solutions to replace the springs in such valves are particularly employing forces that can be delivered over a physical gap without mechanical contact are all within the scope of the invention. Therefore solutions that employ various fields to span a gap or that employ fluid pressure optionally in conjunction with accumulators are all within the scope of the invention.

It is to be understood that this disclosure is merely illustrative of the presently preferred embodiments of the invention and that no limitations are intended other than as described in the appended claims.

I claim:

1. An apparatus, comprising:
   a guard having a first bore;
   a shoe directly mounted within the first bore in the guard;
   a valve member configured to translate along a path from a sealed position to an unsealed position;
   a magnet coupled to the valve member;
   an opposing magnet directly mounted in the shoe, wherein poles of the opposing magnet are generally aligned with poles of the magnet such that the magnet and the opposing magnet repel one another; and
   a leg extending from the valve member in a direction that is generally parallel to the path, wherein a distal portion of the leg overlaps the opposing magnet when the valve member is in the sealed position, wherein the leg, the shoe, and the opposing magnet are generally concentric, and wherein the leg is configured to translate between the guard and the shoe.

2. The apparatus of claim 1, comprising a button that retains the magnet and comprises the leg.

3. The apparatus of claim 1, wherein the leg defines a second bore.

4. The apparatus of claim 3, wherein the magnet is at least partially disposed in the second bore.

5. The apparatus of claim 1, wherein the valve member comprises a poppet, and wherein the magnet is directly mounted to the poppet.

6. The apparatus of claim 1, wherein the leg is configured to translate through the first bore in the guard, and wherein the leg defines an end for the path of the valve member.

7. The apparatus of claim 1, wherein poles of the magnet are generally aligned with the path.

8. The apparatus of claim 1, wherein the leg overlaps the magnet and is generally concentric with the magnet.

9. The apparatus of claim 1, comprising a compressor that comprises the valve member, the guard, and the shoe.

10. The apparatus of claim 1, wherein the guard comprises a first aperture, the shoe comprises a second aperture, and the opposing magnet comprises a third aperture.

11. The apparatus of claim 1, wherein the leg comprises a first lip and the shoe comprises a second lip, and wherein the first and second lips are configured to limit the stroke of the valve member with respect to the shoe.

12. A valve, comprising:
    a poppet valve having a leg, wherein the poppet valve is configured to seal a passage;
    a first magnet coupled to the poppet valve;
    a shoe having a bore; and
    a second magnet directly mounted within the bore in the shoe, wherein the second magnet is configured to repel the first magnet, thereby biasing the poppet valve in a position that seals the passage, wherein the second magnet comprises an aperture, and wherein the leg, the shoe, and the second magnet are generally concentric; and
    wherein the leg comprises a first lip and the shoe comprises a second lip, and wherein the first and second lips are configured to limit the stroke of the poppet valve with respect to the shoe.

13. The valve of claim 12, wherein adjacent poles of the first magnet and the second magnet are the same.

14. The valve of claim 12, comprising a guard coupled to the shoe, wherein the guard comprises a plurality of passages that are selectively in fluid communication with the passage the poppet valve is configured to seal.

15. The valve of claim 12, wherein the aperture extends through the second magnet in a direction that is generally parallel to the poles of the second magnet.

16. The valve of claim 12, wherein the second magnet, the aperture, and the first magnet are generally concentric about the same axis.

17. A method of controlling the flow of a fluid, comprising:
    biasing a poppet valve having a first magnet against a seat by applying a force with a magnetic field from a second magnet, wherein poles of the first magnet are generally aligned with poles of the second magnet such that the first magnet and the second magnet repel one another;
    moving the poppet valve by applying fluid pressure to the poppet valve, wherein a force from the fluid pressure is larger than the force applied with the magnetic field;
    guiding the movement of the poppet valve with a structure that is downstream from the poppet valve, wherein the structure comprises a shoe mounted in a first bore in a guard, wherein the second magnet is mounted within a second bore in the shoe, and wherein guiding the movement of the poppet valve comprises guiding the movement of a leg extending from the poppet valve between the shoe and the guard; and
    limiting the movement of the poppet valve with respect to the shoe via a first lip extending from the leg and a second lip extending from the shoe.

18. The method of claim 17, wherein the leg, the shoe, and the second magnet are generally concentric.

* * * * *